United States Patent [19]

Christensen

[11] 3,997,087
[45] Dec. 14, 1976

[54] CLOSING MECHANISMS FOR CONCRETE CONTAINERS

[75] Inventor: Kristian Stokbro Christensen, Ringsted, Denmark

[73] Assignee: Ringsted Jernstøberi & Maskinfabrik A/S, Ringsted, Denmark

[22] Filed: Feb. 26, 1975

[21] Appl. No.: 553,290

[30] Foreign Application Priority Data

Mar. 1, 1974 Denmark .......................... 1092/74

[52] U.S. Cl. .............................................. 222/413
[51] Int. Cl.² .................. B65G 65/46; B65G 65/56
[58] Field of Search .................. 222/411, 412, 413; 141/256, 257, 259; 416/235, 236, 237, 242; 239/683; 251/126

[56] References Cited

UNITED STATES PATENTS

| 146,107 | 12/1873 | Taggart | 141/256 X |
| 1,881,365 | 10/1932 | Martin | 416/235 |
| 2,023,111 | 12/1935 | Alsing | 416/144 |

*Primary Examiner*—Robert B. Reeves
*Assistant Examiner*—John P. Shannon
*Attorney, Agent, or Firm*—Ernest F. Marmorek

[57] ABSTRACT

A closing mechanism for the outlet of a concrete container and comprising a vertical shaft carrying a feed worm having at least three grooves defined by threads. Each thread extending at the outside as well as at the inside over an angle not below $360/n°$ and not exceeding $720/n°$, where $n$ is the number of threads, and having over its whole width angles of inclination not below 8° and not exceeding 15°. Preferably the upper edge of each thread forms an upwards open angle of between 65° and 90° with the shaft, and the transition between said upper edge and the peripheral edge of the thread is rounded off with a radius of curvature of between 35 % and 55 % of the width of the thread. Further advantageously the lower edge of each thread may be curved so that over its whole length it is overlapped by the previous thread and that the outer portion of the lower part of the thread forms a rearwardly extending tongue having over the greatest part of its length a width less than one third of the width of the thread.

11 Claims, 2 Drawing Figures

CLOSING MECHANISMS FOR CONCRETE CONTAINERS

FIELD OF THE INVENTION

This invention relates to a closing mechanism for concrete silos, hoppers and the like concrete containers and adapted to be arranged within the outlet of the container and being of a type making dosing of the amount of concrete dispensed at a time possible.

BACKGROUND OF THE INVENTION

From most concrete silos or the like concrete containers, especially such ones used in connection with concrete molding machines, each time dispensing of concrete takes place a specified amount of concrete, only slightly varying from time to time, has to be given off. As closing mechanisms for such silos or containers are most commonly used manually or automatically operated slide gates. Such a slide gate may be operated with a relatively close accuracy, especially when the concrete is relatively wet and, consequently, more free-flowing. Very often, however, a concrete is used containing only relatively small amounts of water and, therefore, having a very low viscosity, and such a concrete has shown when flowing through pipes or openings of limited dimensions to have a marked tendency to pack along the pipe walls or along the periphery of the opening and, besides, shortly after an outlet having been opened and after some, normally irregular, lumps of concrete having fallen out the concrete has a tendency of forming a plug-like assembly domed upwards at its lower end. Such a concrete assembly or concrete plug may be loosened by gentle knock or by the use of an agitator within the container, but even in such cases the concrete will have a tendency of falling out as lumps whereby an accurate dosing and an even distribution of the concrete within a mold may be made difficult, especially in case the distribution is performed by means of a swivelling distribution chute.

For conveying of concrete it is known to use a single threaded worm conveyor having, however, a very great power consumption even when used for downwards vertical transport and in spite thereof that in this case the weight of the concrete should facilitate the transport. Besides, such worm conveyors also bring about a relatively uneven transport of the concrete. Therefore, even if such a worm conveyor, provided it was arranged within the outlet of a concrete silo or other concrete container, could possibly be effective as a closing mechanism, hitherto such worm conveyors have never been used for said purpose, and when vertically arranged they have been used within concrete containers they have only served as conveying agitators.

OBJECTS OF THE INVENTION

It is the principal object of the present invention to provide an improved closing mechanism for concrete silos, hoppers and the like concrete containers, which mechanism besides being effective as a closure is also able to ensure dispensing of concrete from the silo or container as an even stream that is easy to dose, and by which mechanism this is obtained without the mechanism having any higher power consumption.

It is another object of the present invention to provide such a closing mechanism by means of which the dosing can be so exact that even by automatic, for example electronic control of the mechanism only very small variations of the amounts of concrete dispensed at a time may appear.

SUMMARY OF THE INVENTION

These objects and others, according to the invention, are attained by the closing mechanism comprising a feed worm of a special design and carried by a rotatable shaft adapted for vertical arrangement, whereby said worm comprises at least three grooves, and each of the threads limiting the grooves extends, at the inside as well as at the outside over an angle that is not below $360/n°$ and not exceeds $720/n°$ where $n$ is the number of threads, and by which worm the angles of inclination of each thread are over the whole width thereof not below 8° and not exceeding 15°, preferably are between 10° and 12°.

When such a feed worm is rotated the upper edges of the threads will work somewhat like the cutting edges of an end mill and will evenly mill off material from the downwards moving concrete above the mechanism. Thus the concrete is cut into flakes which are, however, immediately thereafter broken into pieces owing to the influence from the undersides of the threads, and owing to the relatively short overlap between the upper edge of one thread and the lower edge of the following thread the concrete will without difficulty leave the worm as an even flow. Further, the use of at least three threads ensure that during the sinking of the concrete the same influences the top sides of the threads with a relatively small pressure only, and, consequently, the worm will have for its driving only a relatively little power requirement. Still further, owing to the small angles of inclination the concrete on the upper sides of the threads will have no tendency to slide downwards along the upper sides of the threads, wherefore the worm will provide, when standing still and in spite of the small overlap between the threads, an effective closure for the outlet of the concrete silo or the like concrete container.

As long as the rotary speed of the worm is kept below a certain maximum speed that depends on the viscosity of the concrete, the concrete dispensing capacity of the mechanism will be approximately proportional to the rotary speed and, therefore, it may be advantageously that the driving device for the worm allows adjustment of the rotary speed, preferably continous variable adjustment thereof, whereby the possibility of a quick and exact dosing is increased, especially in case the rotary speed is gradually reduced during the termination of each working period. In this case it is even possible to obtain such an exact dosing that even by automatic, for example electronic, control of the driving device only very small variations of the amount of concrete dispensed during each working period will show up.

Further, it may be advantgeous if the upper edge of each thread forms an upwards open angle not exceeding 90°, preferably an angle between 65° and 75° with the shaft whereby the tendency of the concrete during its downwards moving through the outlet of the container to pack intensely at the walls of the outlet and thereby to form an upwards domed bridge preventing the even downwards movement of the concrete over the whole width of the outlet is effectively prevented.

For the same reason it may be advantageous that the transition between the upper edge of each thread and the peripherical edge thereof is rounded with a radius of curvature not exceeding 55% of the width of the thread, preferably being between 35% and 55% of the said width, most advantageously being greater than 45% of the said width, whereby it may be effectively prevented that the foremost upper corner of the thread packs the concrete infront thereof.

Still further it may be advantageous if each thread covers at its inner side an angle that is only a little, for example about 10°, greater than 360/$n$°, but at its outer side covers an angle of between 1.5 and 2 times 360/$n$°. Hereby it is obtained that the outer parts of the milled off concrete during its falling down from the thread will be forced somewhat in direction towards the axis of rotation whereby the concrete will be evenly distributed over the whole cross-sectional area defined by the worm.

This last said effect may be still more pronounced in case the lower edge of each thread is curved so that over its whole length it is overlapped by the previous thread and that the lower outer part of the thread forms a rearwardly extending tongue that over the greatest part of its length, reckoned from the rearmost end thereof, has a width smaller than one third of the ordinary width of the thread.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
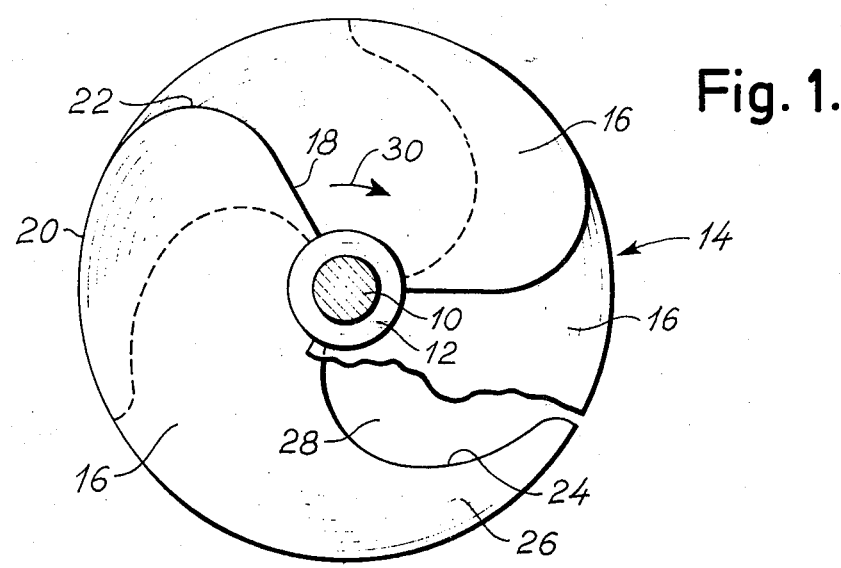
FIG. 1 is a top plan view of an embodiment of the closing mechanism constructed in accordance with the invention, but with a part of a thread broken away.
Figure 2:
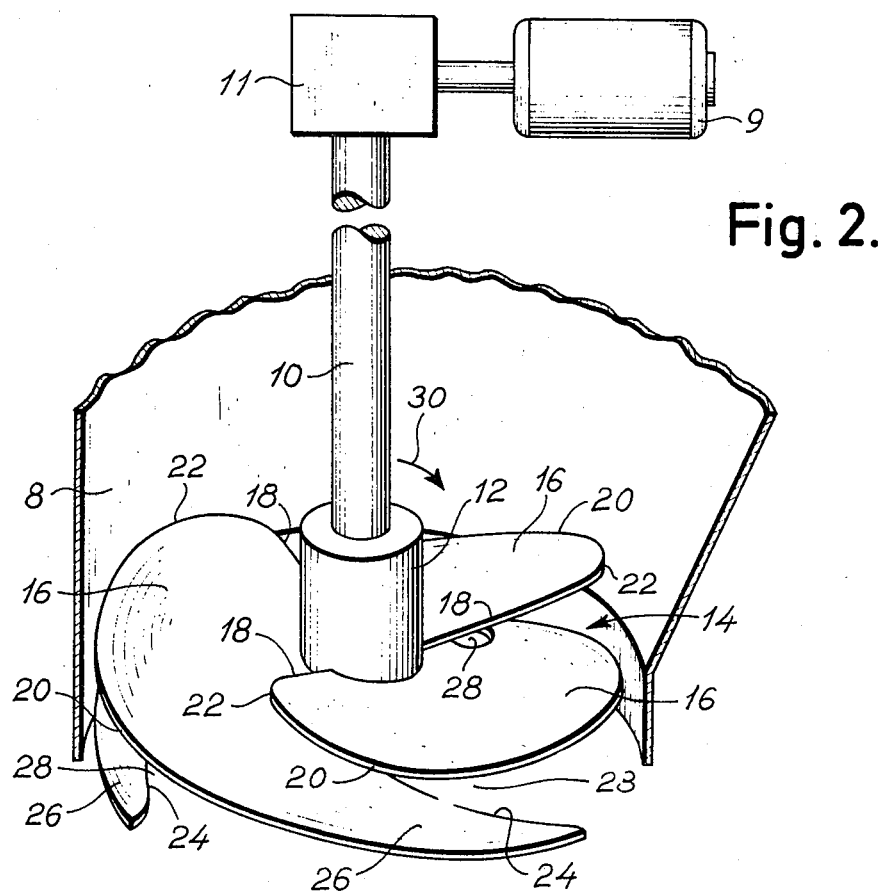
FIG. 2 is a somewhat diagrammatic perspective view showing a vertical section through an outlet of a concrete silo in which a closing mechanism as the one shown in FIG. 1 is arranged.

Downwards through the outlet 8 of a concrete silo or the like concrete container extends a shaft 10 driven by a motor 9 arranged above the silo and connected to the shaft through a gear device 11, preferably a continuously variable such one. A hub 12 of a feed worm 14 having three grooves defined by three threads 16 is attached to the lower end of the shaft 10 at the outlet opening of the outlet 8.

In the embodiment shown each thread 16 has over its whole width angles of inclination of about 11°, but the angles of inclination may vary over the width of the tread 16, for example evenly increase from 8° at the periphery of the thread 16 to 15° near the hub 12, but at all events the angles of inclination has not to be below said lower limit of 8° and not to exceed said upper limit of 15°.

The shape of the threads appears most distinctly from FIG. 1 in which the one thread 16 is broken away so that the preceding thread 16 is approximately shown in full. Only the last said thread 16 has its different parts provided with references.

Each thread 16 has a rectlinear, radially extending upper end edge 18 that forms an upwards open angle of 70° with the shaft 10, more definitely with the axis of rotation of said shaft. The said angle ought not to exceed 90° and preferably not to be below 65°. The upper end edge 18 continues into the peripheral edge 20 of the thread 16 through a rounding 22 having a radius of curvature a little below half the width of the thread 16, but having not to be below 35 % of said width and not to exceed 55 % thereof. The three threads 16 are so placed on the hub 12 that the roundings 22 are equiangularly situated in the same plane with a mutual angle distance of 120°. At the hub 12 each thread 16 extends over en angle of about 130° whereby overlap between each two consecutive threads 16 is ensured, whereas the peripherical edge 20 of each thread, reckoned from the theoretical point of intersection between said edge 20 and the extension of the rectlinear upper end edge 18, extends over en angle of about 210°. The lower backwards facing end edge 24 of each thread 16 is curved so that each thread 16 at its foot peripherically forms a backwards extending tongue 26, that over at least two thirds of its length reckoned from its rear end has a width less than one third of the ordinary width of the thread, said width of the tongue 26 evenly increasing forwards from the free end thereof. Thus the edge 24 limits a relief recess 28 that has shown to be very advantageous in reduction of the power consumption of the closing mechanism as well as in ensuring an evenly distribution of the concrete dispensed over the cross-sectional area of the outlet.

OPERATION

When the shaft 10 stands still, the feed worm 14, having a diameter adapted to the diameter of the silo outlet opening, constitutes an effective closure for the silo since owing to the relatively small angles of inclination of the threads the concrete will have no tendency of sliding along the upper surfaces of the threads towards the relief recesses 28.

When a portion of concrete has to be dispensed from the silo the shaft 10 is brought to rotate in the direction of rotation indicated by the arrows 30, whereby the upper end edges 18 of the threads 16 mill off flakes from the concrete resting on the upwards turning part of the worm 14. These flakes are thereupon brought to fall out mainly through the relief recesses 28. The faster the shaft 10 rotates, up to an upper limit depending on the ability of the concrete within the silo to sink, the greater amounts of concrete will be dispensed from the silo per unit of time and these amounts will be approximately proportional to the number of revolutions of the shaft 10 and has shown at constant numbers of revolutions to be amazing constant. Therefore, even by automatic control of the driving motor 9 and of the gear device 11 of the shaft 10 it is possible to ensure an extremely exact dosing.

What I claim is:
1. A closing mechanism for stopping and, respectively, controlled dispensing of concrete through a concrete dispensing outlet connected to a container for concrete, the outlet having inner walls defining an upright outlet passage having a circular contour, said closing mechanism comprising:
   a controllably rotatable shaft; and
   a feed worm including a hub operably connected to said shaft whereby said feed worm is rotated by said shaft in a direction of rotation;
   said feed worm being adapted to be normally at least partially disposed in said outlet passage and comprises at least three threads which define an equal number of grooves;
   each thread having an upper limitation and a lower limitation and being disposed about said hub and extending for an angular distance of from slightly greater than 360° divided by the number of threads to about 720° divided by the number of threads, said lower limitation of each thread thereby being overlapped by said upper limitation of the one of said threads that, in said direction of rotation, is behind the same; each said thread being normally extended radially from said hub with a peripheral edge portion conforming to the inner walls of the outlet to form substantially a seal with the inner walls against the flow of concrete while the feed worm is rotated and, respectively is at rest, each said thread having throughout its angular distance, an angle of inclination of from about 8° to about 15° whereby the flow of concrete through said grooves will be normally restrained when the feed worm is not rotated, and controllable quantities of concrete will flow through the grooves when the feed worm is rotated; said upper limitation comprising a flat upper edge part extending outwardly from said hub and forming an upwards open angle not exceeding 90° with the axis of said hub.

2. A closing mechanism as defined in claim 1, said angles of inclination being between 10° and 12°.

3. A closing mechansim as defined in claim 1, said upwards open angle being between 65° and 75°.

4. A closing mechanism as defined in claim 1, each said thread having an upper end edge, a peripheral edge and a transition between said two edges, said transition being rounded with a radius of curvature not exceeding 55 % of said radial extent of said thread and being not below 35 % of said radial extent.

5. A closing mechanism as defined in claim 4, said radius of curvature being between 45 % and 50 % of said radial extent.

6. A closing mechanism, as claimed in claim 1, wherein each thread near said hub extends about said hub for an angular distance of up to 10° in excess of 360° divided by the number of threads and near said peripheral end portion for an angular distance of between about 1.5 and 2.0 times 360° divided by the number of threads.

7. A closing mechanism, as claimed in claim 6, wherein each thread, when normally disposed, includes an upper edge and a transition portion defined between said upper edge and said peripheral edge portion, the measurement of said angular distance near the peripheral edge portion being determined from the point where an extension of the upper edge would intersect with an extension of the peripheral edge portion.

8. A closing mechanism as defined in claim 6, wherein said lower limitation of each thread is constituted by a lower edge that is curved so that at the lower outer part of said thread a rearwardly extending tongue is formed, said tongue having over the greatest part of its length, reckoned from the free end of said tongue, a width smaller than one third of the radial extent of said thread.

9. A closing mechanism, as claimed in claim 1, wherein there are three threads, each thread extending about said shaft for an angular distance of from about 120° to about 130° measured near said shaft and from between 180° to 240° measured near said peripheral end portion.

10. A closing mechanism as claimed in claim 1, wherein said flat upper edge part is rectilinear.

11. A closing mechanism as defined in claim 1, said shaft being adapted to be connected to a driving motor through an infinitely variable gear.

* * * * *